(12) United States Patent
Arnell et al.

(10) Patent No.: US 10,686,814 B2
(45) Date of Patent: Jun. 16, 2020

(54) NETWORK ANOMALY DETECTION

(71) Applicant: HEWLETT PACKARD ENTERPRISE DEVELOPMENT LP, Houston, TX (US)

(72) Inventors: Simon Ian Arnell, Bracknell (GB); Marco Casassa Mont, Bristol (GB); David Andrew Graves, Sunnyvale, CA (US); Edward Reynolds, Plano, TX (US); Niall Lawrence Saunders, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 183 days.

(21) Appl. No.: 15/505,820

(22) PCT Filed: Apr. 10, 2015

(86) PCT No.: PCT/US2015/025454
§ 371 (c)(1),
(2) Date: Feb. 22, 2017

(87) PCT Pub. No.: WO2016/164050
PCT Pub. Date: Oct. 13, 2016

(65) Prior Publication Data
US 2017/0295196 A1 Oct. 12, 2017

(51) Int. Cl.
*H04L 29/06* (2006.01)
*H04L 29/12* (2006.01)
(Continued)

(52) U.S. Cl.
CPC ........ *H04L 63/1425* (2013.01); *G06F 21/552* (2013.01); *H04L 61/1511* (2013.01);
(Continued)

(58) Field of Classification Search
CPC . H04L 63/1408; H04L 63/14; H04L 63/1425; H04L 2463/144; G06F 21/552
See application file for complete search history.

(56) References Cited

U.S. PATENT DOCUMENTS 7,814,546 B1 * 10/2010 Strayer ............... H04L 63/1416
726/23
8,224,942 B1 * 7/2012 Presotto .................. H04L 41/06
709/223

(Continued)

OTHER PUBLICATIONS

Y. Musashi, F. Hequet, D. A. L. Romaña, S. Kubota and K. Sugitani, "Detection of host search activity in PTR resource record based DNS query packet traffic," The 2010 IEEE International Conference on Information and Automation, Harbin, 2010, pp. 1284-1288. (Year: 2010).*

(Continued)

*Primary Examiner* — Kari L Schmidt
(74) *Attorney, Agent, or Firm* — Hewlett Packard Enterprise Patent Department

(57) ABSTRACT

Examples relate to detecting network anomalies. In one example, a computing device may: receive, from each of a plurality of packet capture devices of a private network, domain name system (DNS) query packets that were sent by a particular client computing device operating on the private network, each DNS query packet specifying i) a destination DNS server, ii) a query domain name, and iii) a source address that specifies the particular client computing device; provide at least one of the DNS query packets to a DNS traffic analyzer that is trained to identify DNS anomalies based on characteristics of the DNS query packets; receive anomaly output from the DNS traffic analyzer, the anomaly output indicating a DNS anomaly that was identified for the (Continued)

DNS query packets; and in response to receiving the anomaly output, provide a user device with data specifying the identified DNS anomaly.

20 Claims, 3 Drawing Sheets

(51) Int. Cl.
　　*H04L 29/14*　　(2006.01)
　　*G06F 21/55*　　(2013.01)
　　*H04L 12/26*　　(2006.01)
(52) U.S. Cl.
　　CPC .......... *H04L 63/1408* (2013.01); *H04L 69/40* (2013.01); *H04L 43/12* (2013.01); *H04L 63/14* (2013.01); *H04L 2463/144* (2013.01)

(56) References Cited

U.S. PATENT DOCUMENTS

| | | | |
|---|---|---|---|
| 8,555,388 B1 | 10/2013 | Wang et al. | |
| 8,613,089 B1* | 12/2013 | Holloway | H04L 63/1416 726/23 |
| 8,621,556 B1* | 12/2013 | Bharali | H04L 61/1511 726/1 |
| 8,745,195 B1 | 6/2014 | Prescotto et al. | |
| 8,925,087 B1 | 12/2014 | Oliver et al. | |
| 8,977,728 B1* | 3/2015 | Martini | H04L 61/1511 709/222 |
| 9,240,976 B1* | 1/2016 | Murchison | H04L 63/1408 |
| 9,245,121 B1* | 1/2016 | Luo | H04L 63/1408 |
| 9,325,735 B1* | 4/2016 | Xie | H04L 63/145 |
| 9,875,355 B1* | 1/2018 | Williams | G06F 21/56 |
| 2003/0200335 A1* | 10/2003 | Choi | H04L 29/12066 709/245 |
| 2005/0259645 A1* | 11/2005 | Chen | H04L 29/12066 370/389 |
| 2006/0146816 A1* | 7/2006 | Jain | H04L 63/1408 370/389 |
| 2008/0155694 A1* | 6/2008 | Kwon | H04L 29/12066 726/23 |
| 2010/0131646 A1* | 5/2010 | Drako | H04L 29/12066 709/225 |
| 2011/0246634 A1* | 10/2011 | Liu | H04L 29/12066 709/223 |
| 2012/0023153 A1* | 1/2012 | Karasaridis | H04L 61/1511 709/203 |
| 2012/0054869 A1* | 3/2012 | Yen | H04L 29/12066 726/24 |
| 2012/0084423 A1* | 4/2012 | McGleenon | H04L 61/1511 709/223 |
| 2012/0099592 A1* | 4/2012 | Ludwig | H04L 12/1485 370/392 |
| 2012/0233311 A1* | 9/2012 | Parker | H04L 43/00 709/224 |
| 2012/0278889 A1 | 11/2012 | El-Moussa et al. | |
| 2013/0031625 A1* | 1/2013 | Lim | G06F 21/552 726/22 |
| 2013/0031626 A1* | 1/2013 | Kim | H04L 63/1458 726/22 |
| 2013/0042299 A1 | 2/2013 | Osterweil et al. | |
| 2013/0061321 A1 | 3/2013 | Gardner | |
| 2013/0117282 A1 | 5/2013 | Mugali, Jr. et al. | |
| 2013/0191915 A1* | 7/2013 | Antonakakis | H04L 63/14 726/23 |
| 2013/0198803 A1* | 8/2013 | Osterweil | H04L 61/1511 726/1 |
| 2013/0318609 A1* | 11/2013 | Kim | H04L 63/1441 726/23 |
| 2014/0075558 A1* | 3/2014 | Ward | H04L 63/1425 726/23 |
| 2014/0089661 A1 | 3/2014 | Mahadik et al. | |
| 2014/0201528 A1* | 7/2014 | Krig | H04L 67/22 713/168 |
| 2014/0304412 A1* | 10/2014 | Prakash | H04L 61/1511 709/226 |
| 2015/0020199 A1 | 1/2015 | Neil et al. | |
| 2015/0169332 A1* | 6/2015 | Fisher | G06F 9/441 707/769 |
| 2015/0188949 A1* | 7/2015 | Mahaffey | H04L 63/20 726/1 |
| 2015/0271031 A1* | 9/2015 | Beevers | G06F 16/29 709/224 |
| 2015/0341382 A1* | 11/2015 | Jain | H04L 63/1458 726/23 |
| 2015/0350229 A1* | 12/2015 | Mitchell | G06F 16/955 726/23 |
| 2016/0164826 A1* | 6/2016 | Riedel | H04L 61/1511 709/223 |
| 2016/0294852 A1* | 10/2016 | Hagen | H04L 63/1425 |
| 2016/0308795 A1* | 10/2016 | Cheng | H04W 4/12 |
| 2016/0359887 A1* | 12/2016 | Yadav | H04L 63/1425 |
| 2017/0041332 A1* | 2/2017 | Mahjoub | H04L 61/1511 |
| 2017/0063929 A1* | 3/2017 | Burbridge | H04L 61/1511 |
| 2017/0250946 A1* | 8/2017 | Chan | H04L 61/1511 |
| 2017/0272454 A1* | 9/2017 | Seo, II | H04L 1/203 |
| 2017/0310709 A1* | 10/2017 | Foxhoven | H04L 63/20 |
| 2018/0139224 A1* | 5/2018 | Arnell | H04L 41/12 |
| 2018/0241761 A1* | 8/2018 | Bania | H04L 63/1425 |

OTHER PUBLICATIONS

Sekar, Ramasubramanian, et al. "Specification-based anomaly detection: a new approach for detecting network intrusions." Proceedings of the 9th ACM conference on Computer and communications security. 2002, pp. 265-274. (Year: 2002).*

Yarochkin, Fyodor, et al. "Investigating DNS traffic anomalies for malicious activities." 2013 43rd Annual IEEE/IFIP Conference on Dependable Systems and Networks Workshop (DSN-W). IEEE, 2013, pp. 1-7. (Year: 2013).*

International Search Report and Written Opinion, International Application No. PCT/US2015/025454, dated Feb. 24, 2016, pp. 1-10, KIPO.

opendns.com, "Umbrella Features," Retrieved on Jan. 20, 2015; pp. 1-9, Available at: <opendns.com/enterprise-security/features/#product-tour>.

Moran et al., "Threat Research: Operation Poisoned Hurricane", FireEye Technical Blog, available online at <https://www.fireeye.com/blog/threat-research/2014/08/operation-poisoned-hurricane.html>, Aug. 6, 2014, 11 pages.

* cited by examiner

NETWORK ANOMALY DETECTION

BACKGROUND

Computer networks and the devices that operate on them often experience problems for a variety of reasons, e.g., due to misconfiguration, software bugs, and malicious network and computing device attacks. In a network services industry, e.g., where a service provider provides computing resources operating on a private network for use by various users, the size and complexity of a private network may make detecting problems with the network difficult. A compromised computing device, for example, may operate in a malicious manner within a private network for a significant period of time before the malicious activity can be identified and handled.

BRIEF DESCRIPTION OF THE DRAWINGS

The following detailed description references the drawings, wherein.

DETAILED DESCRIPTION

Figure 1:
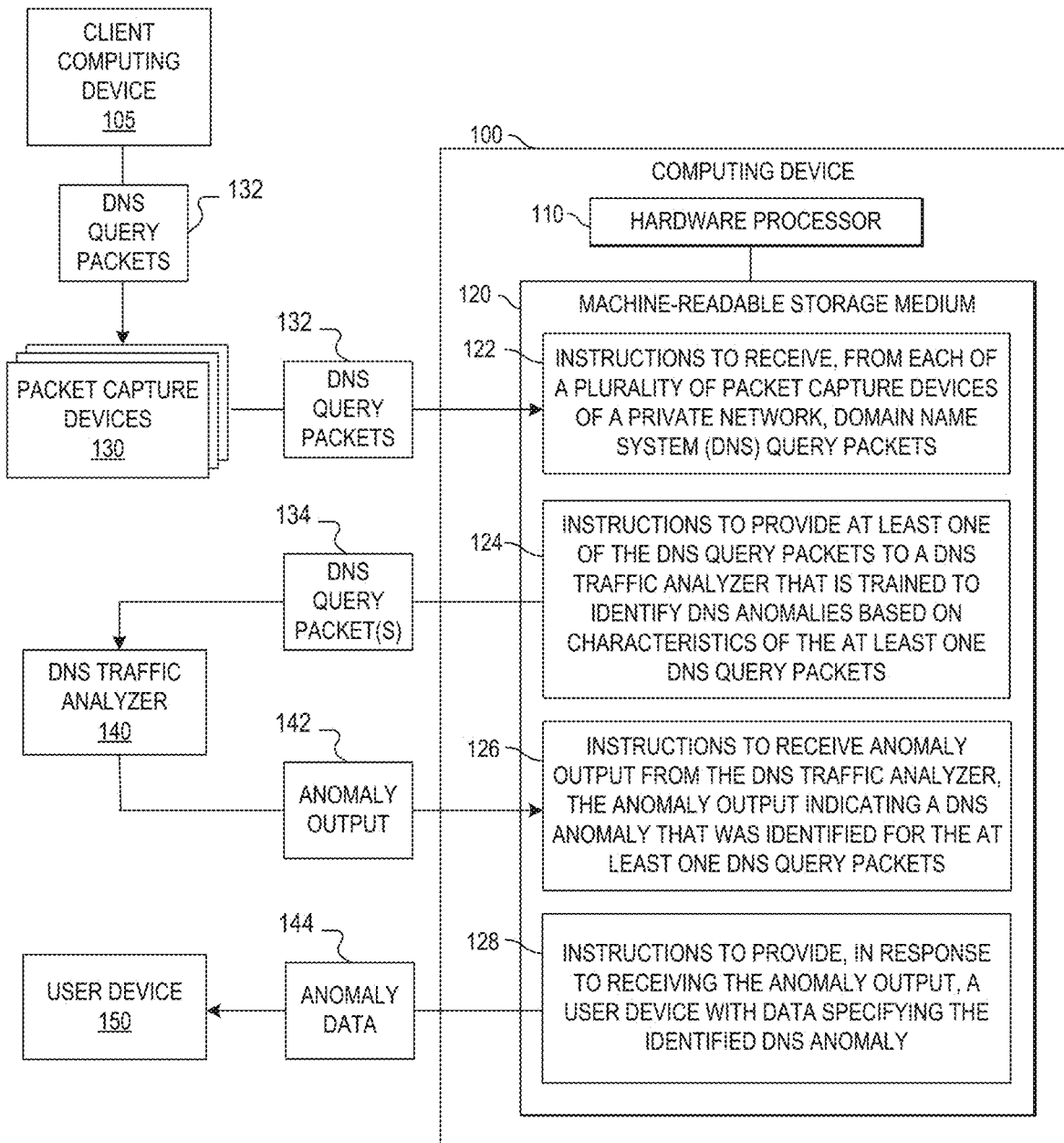
FIG. 1 is a block diagram of an example computing device for detecting network anomalies.

Potentially problematic network activity may be identified by detecting anomalies within a computing network. A network anomaly may be any network activity that deviates from what is standard, or expected. In a computer network, a network anomaly may be indicative of a problem with one or more components of the computing network, and may be caused by a variety of things, such as malicious software ("malware"), malfunctioning hardware, or misconfigured devices, to name a few. Domain Name System (DNS) traffic is one type of network traffic which may be analyzed to identify potential problems with network components. For example, an abnormally high volume of DNS queries issued by a computing device and/or a sudden change in the DNS configuration of a computing device are examples of non-standard network activity that could be caused by malware operating on the computing device. The identification and reporting of network anomalies that occur within a computing network facilitates handling potential problems in the computer network.

Network traffic flows into and out of a private network via egress points, e.g., network routers, switches, firewalls, and/or computing devices configured to implement one or more of the foregoing egress points. The egress point devices are responsible for routing both incoming and outgoing network traffic to their intended destinations. Packet capturing devices, which in some implementations may be included in network egress points, may be configured to scan all received network packets to identify DNS query packets—packets that are address to a domain name system for domain name resolution. DNS query packets, and their corresponding response packets, may be identified by the packet capturing devices of a private network and sent to an anomaly detection device for analysis.

An anomaly detection device uses the DNS packets to identify anomalies in the computing devices operating on the private network and from which the DNS query packets originate. The anomaly detection device may, for example, use a whitelist to filter out DNS query traffic that is known to be safe. A blacklist may also be used to filter DNS query traffic that is known to be indicative of a problem—e.g., DNS queries specifying a domain name that is known to be a host of malicious software. While a whitelist and blacklist may be used to identify DNS queries that are known to be safe or malicious, other analysis may also be performed on some or all of the DNS packets.

The anomaly detection device may use a DNS traffic analyzer that has been trained to identify DNS anomalies based on various DNS packet characteristics. For example, the DNS traffic analyzer may determine that a DNS anomaly exists based on the rate at which a particular computing device on the private network is sending DNS queries, e.g., by determining that the DNS query rate exceeds a particular threshold number of DNS queries over a particular period of time. Responsive to the detection of a network anomaly, the anomaly detection device may take action, for example, by notifying a security event handler and/or an entity responsible for the computing device associated with the anomaly. The detection of network anomalies is discussed in further detail below.

Referring now to the drawings, FIG. 1 is a block diagram of an example computing device 100 for detecting network anomalies. Computing device 100 may be, for example, a server computer, a personal computer, a mobile computing device, or any other electronic device suitable for processing network communications data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-128, to control the process for network anomaly detection. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for network anomaly detection.

As shown in FIG. 1, the computing device 100 executes instructions to receive, from each of a plurality of egress points of a private network, DNS query packets (122). Each DNS query packet was sent by a particular client computing device 105 operating on the private network, and each DNS query packet 132 specifies i) a destination DNS server, ii) a query domain name, and iii) a source address that specifies the particular client computing device. For example, the particular client computing device 105 may be running a variety of applications, such as a web browser or email application, which cause the device to send DNS query packets 132. The DNS server to which each DNS query packet is addressed may be part of the computing device's DNS configuration and/or depend upon particular applications running on the client computing device 105. The DNS query packets 132 may be captured by packet capture devices 130 of the private network within which the particular client computing device 105 operates. Packet capture devices 130 may be implemented in a variety of ways, and may include devices that are part of the network flow, e.g., receiving, capturing, and forwarding packets to the intended destination, and/or in-line devices through which network traffic flows. The DNS query packets 132 may not all be picked up by the same packet capture device, e.g., changes in egress point used for DNS query packets may change which packet capture device is used to capture packets, and egress point changes may be based on a number of things, such as load balancer routing paths, and/or a change in the particular client computing device's DNS configuration.

In some implementations, the particular client computing device 105 sending DNS queries is a virtual machine operating in a cloud computing network. For example, a host computing device running in a private network may host a number of virtual machines, e.g., computing environments that emulate dedicated hardware and software. The virtual machine may cause the host computing device to send DNS queries to one or more DNS servers. While some DNS queries may be addressed to an internal DNS server within the cloud computing network, those DNS queries—and their responses—may also be captured by packet capture devices included in the cloud computing network. DNS queries—and their responses—addressed to an external DNS server may be captured by packet capture devices and forwarded the computing device 100.

The computing device 100 executes instructions to provide at least one of the query DNS packets 134 to a DNS traffic analyzer 140 that is trained to identify DNS anomalies based on characteristics of the at least one DNS query packets 134 (124). As discussed above, analysis of DNS queries issued by a client computing device may provide an indication that the client computing device is malfunctioning and/or infected with malware. In particular, the DNS traffic analyzer 140 may be trained using prior DNS query packets and various machine learning techniques, in a supervised or unsupervised fashion, to identify relationships between various DNS query packet characteristics and malware, for example.

While the computing device 100 implementation depicted in FIG. 1 depicts the capture and analysis of DNS query packets 132, responses to the DNS query packets 132 may also be captured and used to identify DNS anomalies. In some implementations, one or more client computing devices operating on a private network may be used to implement a DNS server, and packet capturing devices may be used to capture and analyze DNS queries coming into the private network, e.g., addressed to the DNS server implemented in one or more client computing devices, as well as the DNS query responses leaving the private network. The characteristics of DNS query packets, both incoming and outgoing, and their responses may provide an indication of a DNS anomaly in a variety of ways, and may depend upon the type of DNS packet, e.g., incoming, outgoing, query, and/or response.

Characteristics that may be indicative of an anomaly include, by way of example, a change in the DNS configuration of a client device, the volume of DNS query traffic being sent from a particular client computing device, the length of DNS events toward a specific destination, pseudo-randomly generated domain names being queried, unrecognized domain name(s) being queried, and mismatches between externally resolved IP addresses and IP addresses resolved by a trusted DNS source, to name a few. The extent to which various characteristics, alone or in combination, indicate a problem may vary and, as described below, the manner in which anomalies are handled may depend upon the characteristics used to detect the anomaly.

In some implementations, the DNS query packet(s) 134 provided to the DNS traffic analyzer 140 exclude whitelisted DNS query packets. For example, if the domain name included in a DNS query packet is included in a whitelist of domain names that was previously determined to be safe, it may be excluded from analysis. In some implementations, the DNS query packet(s) 134 provided to the DNS traffic analyzer 140 exclude blacklisted DNS query packets. For example, if the domain name included in a DNS query packet is included in a blacklist of domain names that was previously determined to be malicious, it may be excluded form analysis. In some implementations, the DNS traffic analyzer 140 may perform whitelist/blacklist lookup and selectively exclude DNS queries from analysis.

The computing device 100 executes instructions to receive anomaly output 142 from the DNS traffic analyzer 140, the anomaly output 142 indicating a DNS anomaly that was identified for the at least one DNS query packet(s) 134 (126). The anomaly output 142 may include various details regarding the DNS anomaly, or anomalies, detected. For example, the anomaly output 142 may indicate that a DNS anomaly was detected due to a change in a particular client computing device's DNS configuration and may further specify details regarding the change, e.g., a change from an internal DNS server to an external DNS server.

In some implementations, the client computing device 105 is one of multiple client computing devices managed by a client. The computing device 100 may execute instructions to receive, from a second set of packet capture devices, a second set of DNS query packets that were sent by another client computing device managed by the client. For example, in a cloud computing network where client computing devices are virtual machines managed by an external client, the external client may manage multiple virtual machines for various purposes, and each virtual machine may have separate network traffic that includes DNS traffic. The DNS packets of each virtual machine may be received by the computing device 100.

In implementations where DNS packets are received from multiple client computing devices, the computing device 100 may execute instructions to combine at least one of the second DNS packets with the DNS packets provided to the DNS traffic analyzer. In this situation, the anomaly output from the DNS traffic analyzer 140 may indicate a client DNS anomaly that includes an anomaly that was identified based on both sets of DNS packets. For example, multiple client computing devices on the private network may collectively implement software that sends DNS queries to randomly generated domain names. In a situation where the DNS traffic analyzer 140 is unable to identify the use of a random domain name generating algorithm from DNS query packets of a single client computing device, the DNS traffic analyzer 140 may be able to identify the use of such an algorithm by analyzing the combined set of DNS query packets that were received from each client computing device.

The computing device 100 executes instructions to provide, in response to receiving the anomaly output 142, a user device 150 with data 144 specifying the identified DNS anomaly (128). In some implementations, the user device 150 is a computing device operating external to the private network. For example, the user device 150 may be a computing device operated by the client that is responsible for managing the client computing device 105. The data 144 may serve to notify the client that its client computing device 105 or devices is/are operating in an abnormal manner. In some implementations, the user device 150 is a computing device operating within the private network. For example, the user device 150 may be a private network computing device of an administrator of the private network, and the data 144 may be reviewed by a computer and/or human administrator to determine how the data 144 should be handled, e.g., by shutting down devices deemed malicious, logging events, and/or notifying client(s) responsible for managing computing devices that may be behaving abnormally.

Data 144 specifying the identified DNS anomaly may, in some implementations, be provided to multiple entities. For example, data 144 may be provided to a private network computing device that uses the data 144 to shut down client computing devices associated with the DNS anomaly, while the same data 144 and/or other data may be sent to the client responsible for the client computing devices that were shut down.

In some implementations, the manner in which the data 144 specifying the identified DNS anomaly is provided to another device—or otherwise handled—depends upon the type of DNS anomaly or anomalies. For example, some DNS anomalies, or combinations of anomalies, are more severe, or more likely to be indicative of a problem, than other DNS anomalies. By way of example, there may be legitimate reasons for a client computing device to change DNS configuration to use an external DNS server, and such a change may result in the anomaly simply being logged without any further action being taken. However, in situations where a private network DNS server resolves a domain name to an IP address that is different from the IP address provided by an external DNS server for the same domain name, this may result in a different action, e.g., shutting down the client computing device and/or warning a private network administrator and/or client of the domain name resolution discrepancy. In some implementations, the manner in which DNS anomalies are handled may depend upon private network settings, administrator preferences, and/or client preferences.

While the DNS traffic analyzer 140 is depicted separately from the computing device 100 in FIG. 1, in some implementations the actions of both may be executed by a single computing device, e.g., computing device 100. In addition, the instructions executed by the computing device 100 need not be performed by a single device and may be performed by multiple computing devices. Other computing device configurations and/or combinations of devices may also be used to execute instructions for identifying DNS anomalies.

Figure 2:
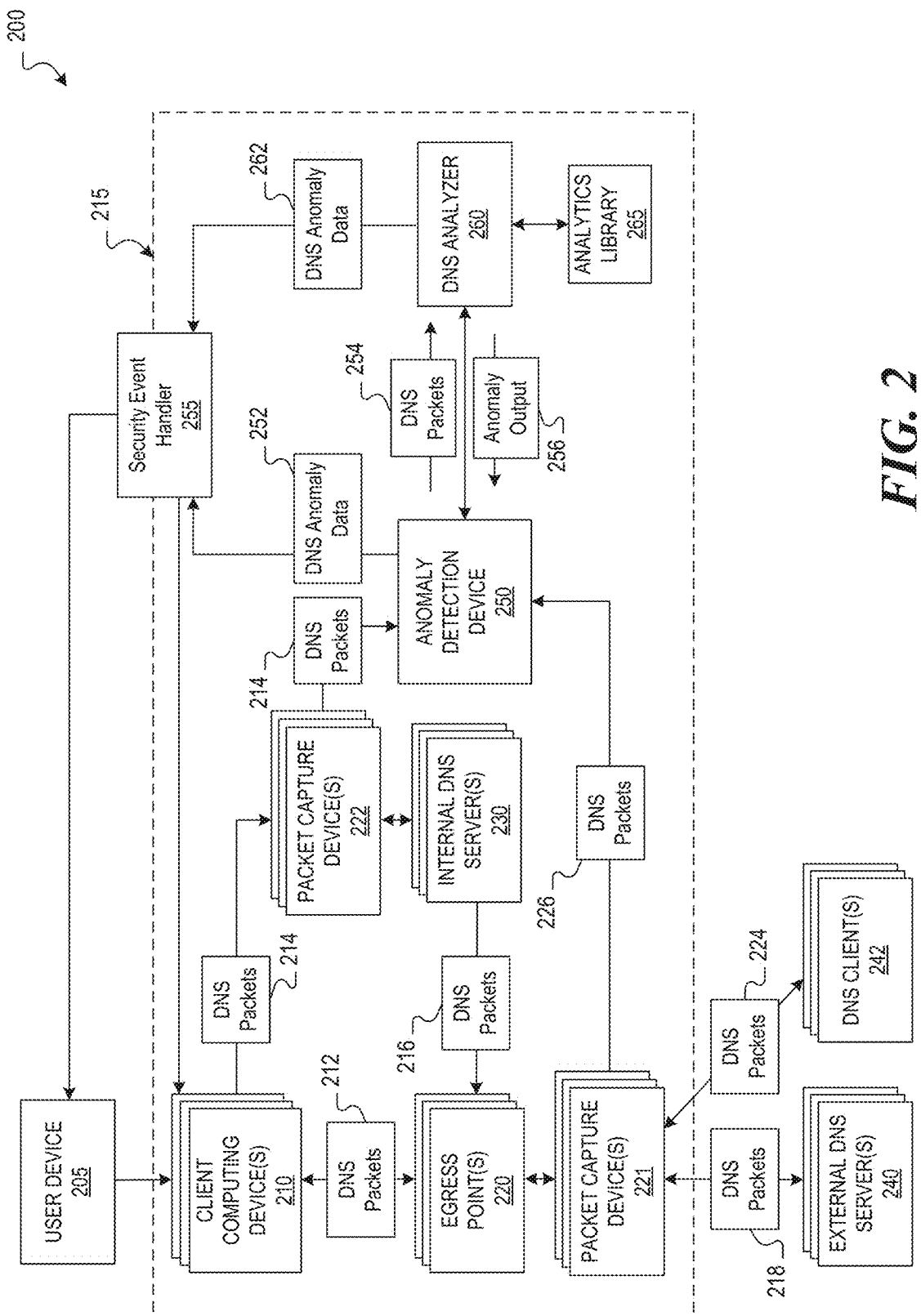
FIG. 2 is an example data flow for detecting network anomalies.

FIG. 2 is an example data flow 200 for detecting network anomalies. The data flow depicts an anomaly detection device 250, which may be implemented by a computing device, such as the computing device 100 described above with respect to FIG. 1. The user device 205 and client computing device(s) 210 may be any computing device suitable for network communications, such as a personal computer, mobile computer, virtual machine, server computer, or any combination thereof. For example, the client computing device(s) 210 may be virtual machines operating within a private cloud computing network 215 and managed by a user device 205 external to the private network 215. The client computing device(s) 210 may be configured to perform various services and/or run various applications, e.g., as specified by the user device 205. By way of example, a client that operates the user device 205 may rent computing resources, such as the client computing devices 210, from the operator of a cloud computing network, such as the network 215, for use in providing web services, such as an e-mail application, to end-users.

During their operation, client computing device(s) 210 may periodically communicate using various network communications protocols. DNS queries are one form of network communications that may originate from the client computing device(s) 210, e.g., in the form of DNS packets 212 and 214. Each of the DNS packets 212 and 214 specify the source client computing device, e.g., using an IP address, and is addressed to a DNS server which will perform domain name resolution. For example, in a situation where the client computing device(s) 210 implement an e-mail application, a DNS query packet may be issued to identify the destination for an email addressed to "user@example.com." A DNS response packet specifying the IP address for "example.com" may be returned to the querying computing device. DNS packets 212 addressed to an external DNS server may be sent through one or more network egress points 220, while DNS packets 214 are addressed to an internal DNS server. In some situations, e.g., when one of the internal DNS server(s) does not resolve a domain name, the respective DNS packet(s) 216 may also be sent through network egress point(s) 220 for resolution by an external DNS server.

Each of the DNS query packets 212 addressed to an external DNS server passes through an egress point 220 of the network 215. Egress point(s) 220 may be, for example, routers and/or switches operating within the private network 215. Egress point(s) 220 forward received DNS packets 218 to their intended destination, e.g., external DNS server(s) 240. In implementations where packet capture devices are implemented in egress point(s) 220, the egress point(s) 220 also provide DNS packets 226 to the anomaly detection device 250. The DNS packets 218 provided to the anomaly detection device 250 may include all or a subset of the DNS packets 212 provided by the client computing device(s) 210. In situations where multiple client computing devices managed by multiple clients and user devices, the anomaly detection device 250 may be provided with all DNS packets.

In implementations where packet capture device(s) 221 and 222 are implemented separately from egress point(s) 220, the packet capture device(s) 221 and 222 are responsible for capturing and forwarding DNS packets, e.g., DNS packets 214 and 226, to the anomaly detection device 250. A combination of stand-alone packet capture device(s) 221 and 222 and packet capture devices implemented in one or more egress point(s) 220 may be used to capture DNS packets and provide them to the anomaly detection device 250. As noted above, packet capture device(s) 221 and 222 may be implemented in a variety of ways, e.g., devices that receive and forward packets as part of the network flow and devices that are separate from the network flow and capture packets as they flow by.

In some implementations, one or more client computing device(s) 210 may be configured to implement a DNS server. In this situation, DNS packets 224 may be captured coming into and leaving the private network. For example, DNS clients 242 may issue DNS queries addressed to the DNS server implemented within the private network 215. These DNS queries, and their responses, may pass through packet capture device(s) 221 and egress point(s) 220, and be forwarded to the anomaly detection device 250 for analysis.

The anomaly detection device 250, after obtaining DNS packets 214 and 226, may use a whitelist to filter packets that are not to be analyzed because they are considered safe. For example, DNS queries for well-known domain names and/or DNS queries addressed to well-known and considered safe DNS servers, may be filtered out of further analysis for DNS anomalies. In some implementations, however, DNS packets that may normally be whitelisted may in fact be kept for analysis based on certain DNS packet characteristics. For example, if DNS query traffic from one or more client computing device(s) 210 is too high—which may be indicative of client computing device(s) 210 being used for a denial of service (DoS) attack, even DNS queries having characteristics included in a whitelist may be kept for further analysis.

The anomaly detection device 250 may use a blacklist to filter DNS packets that are considered malicious or otherwise problematic. DNS packets that are included in a blacklist, for example, may immediately trigger a DNS anomaly—without the need to perform further analysis on the DNS packets 214 and 226. For example, a DNS query specifying a website that was previously identified as a website hosting malware may trigger a DNS anomaly. The anomaly detection device 250 may facilitate identification of DNS anomalies in a variety of other ways. For example, the anomaly detection device 250 may store DNS packets for later analysis and/or for use as training data when using machine learning techniques to identify DNS anomalies. In some implementations, instead of or in addition to filtering DNS packets having characteristics in a blacklist, the DNS packets may be sent for further analysis, e.g., to identify other possible DNS anomalies.

In response to identifying a DNS anomaly, the anomaly detection device 250 may provide DNS anomaly data 252 to a security event handler 255. The security event handler 255 may be internal and/or external to the private network 215, and may be a combination of computing device(s) and/or human handling. For example, a private network administrator may review DNS anomaly data 252 and determine whether any action is to be taken, e.g., shutting down client computing device(s) 210 that are not operating properly and/or notifying a client's user device 150 of abnormal DNS behavior.

The anomaly detection device 250, after filtering DNS packets 214 and 226 using a whitelist and/or blacklist, provides the remaining DNS packets 254 to the DNS analyzer 260. While the DNS analyzer 260 is depicted as being separate from the anomaly detection device 250 in the example data flow 200, in some implementations they may be implemented using the same computing device(s).

To identify a DNS anomaly for a particular client computing device 210 included in the private network 215, the DNS analyzer 260 may analyze the DNS query packets sent by the particular client computing device 210 and/or the DNS response packets sent in response to the queries. Each of the DNS query packets includes a source address that specifies the particular client computing device 210 for which DNS query packets are analyzed. In situations where a single client computing device 210 is performing abnormal DNS queries and/or is receiving abnormal responses, the ability to isolate and analyze the DNS packets coming from the single device may facilitate in identification of the problem(s) associated with the abnormal DNS traffic.

In some implementations, the DNS analyzer 260 analyzes DNS query traffic originating from multiple client computing devices managed by a single client. In situations where multiple client computing devices 210 are collectively producing and/or receiving abnormal DNS traffic, analysis of the individual DNS packet streams from each client computing device may not be sufficient to identify a DNS anomaly, and the combination of DNS packets from multiple computing devices may facilitate identification of the problem(s) associated with the collectively abnormal DNS traffic.

A DNS anomaly, or anomalies, may be identified by the DNS analyzer 260 and provided to the anomaly detection device 250 in the form of anomaly output 256. The anomaly output 256 may be handled by the anomaly detection device 250 in a variety of ways, e.g., logging or reporting to the security event handler 255. The manner in which DNS anomalies are identified by the DNS traffic analyzer 260 may vary, and may depend upon the characteristics of the DNS packets 254. As noted above, the DNS traffic analyzer 260 may be trained to identify anomalies using a variety of machine learning techniques. For example, using data representing previous occurrences of DNS anomalies, the DNS analyzer 260 may be trained to identify a DNS anomaly when DNS query traffic from any single computing device exceeds a particular threshold DNS query traffic volume, e.g., 50 DNS queries per second. The threshold may vary, for example, based on the type of application(s) running on the client computing device generating the DNS queries. Data stored in an analytics library 265 may be used by the DNS analyzer 260 to identify DNS anomalies, and the DNS analyzer may periodically update the analytics library 265 data to facilitate future DNS traffic analysis.

In some implementations, when determining whether an anomaly exists, the DNS traffic analyzer 260 may also produce a confidence score associated with an anomaly, the confidence score indicating a measure of likelihood that a problem or anomaly exists. For example, given the same client application, the DNS traffic analyzer may be more confident that a problem exists in a computing device issuing 100 DNS queries per second than a computing device issuing 50 DNS queries per second. In situations where measures of confidence are determined, they may be used to determine whether an anomaly has occurred and how to handle it, e.g., log it, report it, or execute an action.

As noted above, the DNS analyzer 260 may be trained to identify DNS anomalies based on a variety of DNS packet characteristics. For example, characteristics that may be indicative of an anomaly include: a change in the DNS configuration of a client device, the length of DNS events toward a specific destination, pseudo-randomly generated domain names being queried, unrecognized domain name(s) being queried, and mismatches between externally resolved IP addresses and IP addresses resolved by a trusted DNS source, to name a few.

In some implementations, the DNS analyzer 260 is capable of performing a variety of actions designed to facilitate identification of DNS anomalies. For example, the DNS analyzer may identify a change in the DNS configuration of a particular client computing device, e.g., by the DNS query packets changing from the use of an internal DNS server 230 to an external DNS server 240. In this situation, the DNS analyzer 260 may compare addresses resolved by an internal DNS server 230 to addresses resolved by the external DNS server 240 to which the particular client device changed. By comparing the resolved addresses, the DNS analyzer 260 may determine whether an anomaly exists. For example, in a situation where the addresses returned by the internal and external DNS servers match, then DNS configuration change may not trigger a DNS anomaly. However, in a situation where one or more addresses returned by the external DNS do not match the addresses returned by the internal DNS, the determination of the discrepancy may trigger a DNS anomaly.

The DNS traffic analyzer 260, alone or in combination with the anomaly detection device 250, may include and/or be in communication with a variety of other devices and/or databases for detection of DNS anomalies. For example, the whitelist and/or blacklist may be included in a separately updated database accessible to the DNS traffic analyzer 260 and/or anomaly detection device 250. In some implementations, a separate device may be used to gather anomaly feedback, train the DNS traffic analyzer to identify anomalies based on new DNS packet characteristics and/or re-train existing DNS anomaly identification models based on more recent DNS data. For example, a previously unknown DNS server may be placed on a whitelist or blacklist based on analysis of DNS traffic to and from that DNS server. As another example, the DNS analyzer 260 may identify a pattern for recognizing a domain name generation algorithm, which may be used to train the DNS analyzer 260 to identify future uses of the same or a similar domain name generating algorithm.

In the example data flow 200, the DNS analyzer 260 also provides anomaly data 262 to the security event handler 255. The anomaly data 252 and 262 may vary, and may include data specifying the particular DNS anomaly or anomalies identified by the DNS analyzer 260 and/or the anomaly detection device 250. In the example data flow 200, the user device 205, which is operated by the client that is managing the client computing device(s) 210, may be notified of the DNS anomaly in order to allow the client to handle and problem(s) caused by the DNS anomaly. By way of example, as a result of detecting a change in DNS configuration, the security event handler 255 may provide an indication to the user device 205 that the DNS configuration of at least one of the client computing device(s) 210 has changed. In situations where the change was intentional, the client may ignore the notification. However, in situations where the change was unintentional, the client may take steps to ensure the corresponding client computing device(s) 210 are operating properly.

The entity or entities to which anomaly data 252 and 256 is provided may, in some implementations, depend up on the characteristics used to identify the DNS anomaly. For example, a change in DNS configuration—without any other indication of a problem—may not be communicated to a private network administration device, and may be logged instead.

Figure 3:
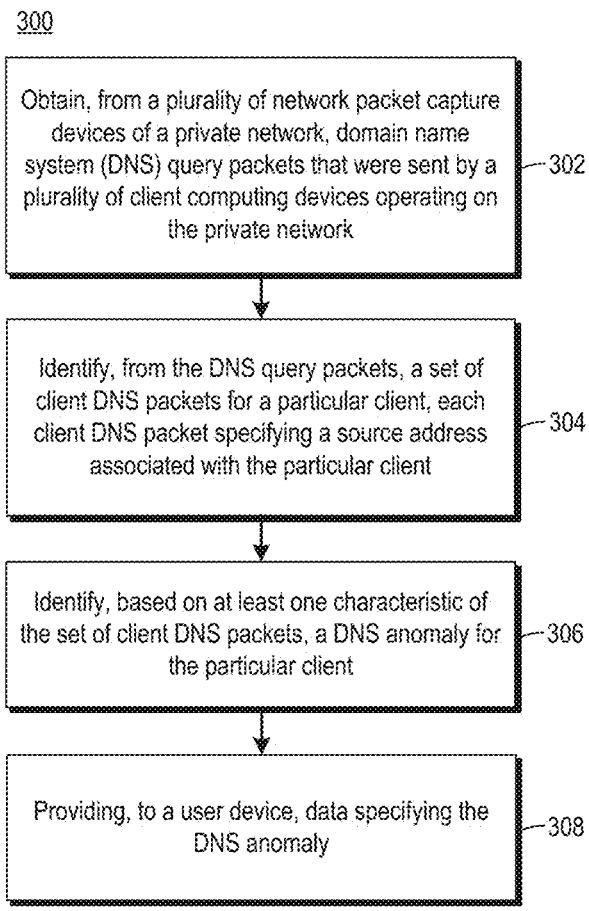
FIG. 3 is a flowchart of an example method for detecting network anomalies.

FIG. 3 is a flowchart of an example method 300 for detecting network anomalies. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry.

DNS query packets that were sent by multiple client computing devices operating on a private network are obtained from multiple network packet capture devices of the private network (302). Each DNS query packet specifies i) a destination DNS server, ii) a query domain name, and iii) a source address that specifies one of the client computing devices. In some implementations, the private network is a cloud computing network, and each of the network packet capture devices is implemented in a router included in the cloud computing network. The client computing devices operating on the cloud computing network may be virtual machines managed by one or more clients, or users. By way of example, each user may rent virtual machines to be hosted by a cloud computing network operator, and the users may configure the virtual machines to perform a variety of functions.

A set of client DNS packets are identified for a particular client from the DNS query packets, each client DNS packet specifying a source address associated with the particular client (304). In some implementations, at least two client computing devices are specified by the client DNS packets. For example, a particular client may manage a subset of the client computing devices that are operating on the private network, and the identified set of client DNS packets are only the DNS packets that specify an address of one of the client computing devices within that subset.

Based on at least one characteristic of the set of client DNS packets, a DNS anomaly is identified for the particular client (306). In implementations where at least two client devices are specified by the client DNS packets, the DNS anomaly may be identified based on characteristics of client DNS packets that specify source addresses of at least two of the client computing devices. For example, a domain name generating algorithm in use by the client computing devices may be detected by analyzing DNS query packets from multiple client computing devices. In some implementations, the DNS anomaly may be identified based on characteristics of client DNS packets that specify only one of the client computing devices. For example, if the average DNS query length—the time it takes for a DNS query packet to be processed—observed for one of the client computing devices exceeds a threshold DNS query length, a DNS anomaly may be identified for the client based on only the characteristics of DNS query packets generated by the one client computing device.

Data specifying the DNS anomaly is provided to a user device (308). In some implementations, the user device is internal to the private network, e.g., a computing device of a private network administrator. In some implementations, the user device is external to the private network, e.g., a computing device of a client that manages the client computing device(s) for which a DNS anomaly was detected. As noted above, the nature of the data specifying the DNS anomaly may vary, as may the functions of the device(s) to which the data is provided.

The foregoing disclosure describes a number of example implementations for detecting network anomalies. As detailed above, examples provide a mechanism for detecting anomalies by analyzing DNS query packets obtained from multiple egress points of a private network and potential applications of a system that is capable of identifying such DNS anomalies.

We claim:

1. A non-transitory machine-readable storage medium encoded with instructions executable by a hardware processor of a computing device for network anomaly detection, the machine-readable storage medium comprising instructions to cause the hardware processor to:

receive, from each of a plurality of packet capture devices of a private network, domain name system (DNS) query packets that were sent by a particular client computing device operating on the private network, each DNS query packet specifying i) a destination DNS server, ii) a query domain name, and iii) a source address that specifies the particular client computing device;

provide at least one of the DNS query packets to a DNS traffic analyzer that is trained to identify DNS anomalies based on (i) characteristics of the at least one DNS query packets, (ii) data representing previous occurrences of DNS anomalies, and (iii) one or more machine learning techniques, wherein the characteristics include one or more of a change in DNS configuration of the particular client computing device and a time it takes to process the at least one DNS query packet;

receive anomaly output from the DNS traffic analyzer, the anomaly output indicating a DNS anomaly that was identified for the at least one DNS query packets;

determine an action that caused the DNS anomaly to occur; and in response to receiving the anomaly output, provide a user device with data specifying the identified DNS anomaly and data specifying the action that caused the DNS anomaly to occur.

2. The storage medium of claim 1, wherein:
the particular client computing device comprises a virtual machine;
the private network comprises a cloud computing network; and
each of the plurality of packet capture devices are implemented in a router included in the cloud computing network.

3. The storage medium of claim 1, wherein the characteristics further include:
a volume of DNS traffic that exceeds a predefined DNS traffic volume threshold;
pseudo-randomly generated domain names specified as the query domain name for at least one of the DNS query packets; or
a domain name unrecognized by an internal DNS operating in the private network.

4. The storage medium of claim 1, wherein the instructions further cause the processor to:
exclude, from the DNS query packets, whitelist DNS packets that specify a whitelisted domain name included in a whitelist of domain names; and
exclude, from the DNS query packets, blacklist DNS packets that specify a blacklisted domain name included in a blacklist of domain names.

5. The storage medium of claim 1, wherein the particular client computing device is one of a plurality of client computing devices managed by a client, and wherein the instructions further cause the processor to:
receive, from each of a second plurality of packet capture devices of the private network, second DNS query packets that were sent by a second client computing device that is included in the plurality of client computing devices, each second DNS query packet specifying i) a destination DNS server, ii) a query domain name, and iii) a source address that specifies the second client computing device;
combine at least one of the second DNS query packets with the DNS query packets provided to the DNS traffic analyzer, and wherein the anomaly output from the DNS traffic analyzer indicates a client DNS anomaly, the client DNS anomaly comprising an anomaly that was identified based on both i) the DNS query packets of the particular client computing device, and ii) the second DNS query packets of the second client computing device.

6. A computing device for network anomaly detection, the computing device comprising:
a hardware processor; and
a data storage device storing instructions that, when executed by the hardware processor, cause the hardware processor to:

obtain, from a plurality of network packet capture devices of a private network, a set of domain name system (DNS) packets, each DNS packet i) being addressed to a DNS server, and ii) having a source address that specifies a client computing device included in the private network;

identify, from the set of DNS packets, whitelist DNS packets that specify a whitelisted domain name included in a whitelist of domain names;

identify, from the set of DNS packets, blacklist DNS packets that specify a blacklisted domain name included in a blacklist of domain names;

identify, from the set of DNS packets, a set of unknown DNS packets by excluding, from the set of DNS packets, each whitelist DNS packet and blacklist DNS packet;

analyze, for a particular client computing device included in the private network, unknown DNS packets having a particular source address that specifies the particular client computing device;

identify, based on (i) at least one characteristic of the analyzed unknown DNS packets, (ii) data representing previous occurrences of DNS anomalies, and (iii) one or more machine learning techniques, a DNS anomaly for the particular client computing device, wherein the at least one characteristic includes one or more of a change in DNS configuration of the particular client computing device and a time it takes to process the unknown DNS packets; and determine an action that caused the DNS anomaly to occur.

7. The computing device of claim 6, wherein a DNS anomaly is identified in response to determining that the at least one characteristic of the analyzed unknown DNS packets indicates:
a volume of DNS traffic that exceeds a predefined DNS traffic volume threshold; or
pseudo-randomly generated domain names; or
a domain name unrecognized by an internal DNS operating in the private network.

8. The computing device of claim 6, wherein:
the client computing device of each DNS packet comprises a virtual machine;
the private network comprises a cloud computing network; and
each of the plurality of network packet capture devices is implemented in a router included in the cloud computing network.

9. The computing device of claim 6, wherein the unknown DNS packets are analyzed by comparing, for each domain name included in each unknown DNS packet, a first address resolved by a first DNS server to a second address resolved by a second DNS server.

10. The computing device of claim 9, wherein a DNS anomaly is identified for the client computing device in response to determining, based on the comparison of the first address and the second address, that a discrepancy exists.

11. A method for network anomaly detection, implemented by a hardware processor, the method comprising:
obtaining, from a plurality of network packet capture devices of a private network, domain name system (DNS) query packets that were sent by a plurality of client computing devices operating on the private network, each DNS query packet specifying i) a destination DNS server, ii) a query domain name, and iii) a source address that specifies one of the plurality of client computing devices;

identifying, from the DNS query packets, a set of client DNS packets for a particular client, each client DNS packet specifying a source address associated with the particular client;

identifying, based on (i) at least one characteristic of the set of client DNS packets, (ii) data representing previous occurrences of DNS anomalies, and (iii) one or more machine learning techniques, a DNS anomaly for the particular client, wherein the at least one characteristic includes one or more of a change in DNS configuration of the particular client and a time it takes to process the unknown DNS packets;

determining an action that caused the DNS anomaly to occur; and providing, to a user device, data specifying the DNS anomaly and data specifying the action that caused the DNS anomaly to occur.

12. The method of claim 11, wherein at least two client computing devices of the plurality of client computing devices are specified by the client DNS packets.

13. The method of claim 12, wherein the DNS anomaly is identified based on client DNS packets that specify source addresses of each of the at least two client computing devices.

14. The method of claim 12, wherein the DNS anomaly is identified based on client DNS packets that specify the source address of only one of the at least two client computing devices.

15. The method of claim 12, wherein:

each of the at least two client computing devices comprise a virtual machine;

the private network comprises a cloud computing network; and each of the plurality of network packet capture devices is implemented in a router included in the cloud computing network.

16. The method of claim 11, wherein the DNS anomaly is identified in response to determining that the at least one characteristic of the set of client DNS packets indicates:

a volume of DNS traffic that exceeds a predefined DNS traffic volume threshold;

pseudo-randomly generated domain names; or a domain name unrecognized by an internal DNS operating in the private network.

17. The method of claim 11, further comprising analyzing the set of client DNS packets by comparing, for each domain name included in each DNS packet of the set of client DNS packets, a first address resolved by a first DNS server to a second address resolved by a second DNS server.

18. The method of claim 17, wherein the DNS anomaly is identified in response to determining, based on said comparing, that a discrepancy exists.

19. The method of claim 11, further comprising excluding, from the set of client DNS packets, whitelist DNS packets that specify a whitelisted domain name included in a whitelist of domain names.

20. The method of claim 11, further comprising excluding, from the set of client DNS packets, blacklist DNS packets that specify a blacklisted domain name included in a blacklist of domain names.

* * * * *